Jan. 18, 1966    R. G. JEWELL    3,229,524
PRESSURE MEASURING TRANSDUCER
Filed Dec. 19, 1962

RICHARD G. JEWELL
INVENTOR.

BY

*Irving Kayton*
ATTORNEY

United States Patent Office 3,229,524
Patented Jan. 18, 1966

3,229,524
PRESSURE MEASURING TRANSDUCER
Richard G. Jewell, Swampscott, Mass., assignor to General Electric Company, a corporation of New York
Filed Dec. 19, 1962, Ser. No. 245,864
14 Claims. (Cl. 73—398)

This invention relates to pressure measuring devices, and more particularly to pressure measuring transducers which convert an input pressure to a proportional output electrical signal wherein the conversion is made without any moving parts in the circuit by virtue of the utilization of pressure variation to magnetic characteristic variation convertibility in ferromagnetic materials.

It is known that the magnetic permeability of ferromagnetic materials may be caused to change in magnitude as a result of a physical stress imposed upon the material. In this way the magnetic flux supported by the magnetic material may be varied proportionally to the imposed stress. Pressure transducers are known in the art utilizing this principle. Thus, for example, it is known to use a hollow tube of ferromagnetic material as the core of a transformer whereby fluid pressure introduced inside of the tube produces a pressure differential across the tube walls, which in turn results in a stress in the material. Such a stress changes the magnetic permeability of the ferromagnetic tube whereby the coupling between the primary and secondary windings of the transformer is varied substantially proportionally. Having two such hollow ferromagnetic core transformers, with one hollow core subject to a reference fluid pressure and the other to a pressure to be measured, and having the coils of the transformers appropriately in circuit with each other, provides a pressure differential measurement as between the two pressures.

Such prior art devices are subject to significant difficulties. One difficulty is that the output electrical signal representing the pressure differential is an extremely weak one because of the high magnetic reluctance inherent in the magnetic circuits of such pressure transducers. A second difficulty is that the location of other magnetic materials in the vicinity of such pressure transducers substantially affects the magnetic permeability, and therefore the magnetic flux supported by the pressure transducer tubes. For this reason, it is often necessary to provide magnetic shielding about the prior art pressure transducer magnetic circuit to preclude spurious permeability variations.

It is an important object of this invention, therefore, to provide a pressure measuring transducer having higher output electric signal levels than provided in the prior art.

It is another important object of this invention to provide a pressure measuring transducer wherein the output signal level of the transducer is independent of the presence or absence of magnetic materials in the spatial environment of the transducer, and which independence is not based upon the use of magnetic shielding material thereabout.

The above objects are accomplished in accordance with the principles of the invention wherein a completely closed magnetic path is provided. The absence of air gaps in the magnetic circuit insures a smaller magnetic reluctance than has heretofore been possible with the advantage of higher electrical output signal level from the electrical circuit. Furthermore, since the magnetic flux of the pressure transducer is maintained substantially completely within the closed magnetic circuit of the transducer it is substantially independent of magnetic material in the environment. More particularly, in the preferred embodiment of the invention, the pressure transducer comprises a hollow toroid of ferromagnetic material upon which a coil is wound. A second and precisely similar toroid and coil may be arranged relative to the first with the coils in series opposition, whereby the electrical output of the combined circuit is the differential between the two coil outputs.

Each of the two toroids has a physical opening permitting fluid to enter the hollow portion of the toroid, with one of the toroids functioning as the reference. Variation in the fluid pressure within the measuring toroid results in a variation in the stress to which the ferromagnetic material of the toroid is subjected and therefore a variation in the magnetic permeability of the toroid. This produces a change in impedance in the electrical circuit of the measuring toroid, and an imbalance in the series opposing coil circuit results. Accordingly, an indication of a pressure differential between the fluid pressure under investigation and the reference pressure maintained in the reference toroid is indicated in the output meter.

It has furthermore been discovered, in accordance with the principles of the invention, that operative and optimum performance of the ferromagnetic pressure transducers requires utilizing a ferromagnetic material whose change in magnitude of magnetic permeability versus stress characteristic is substantially anisotropic, i.e., spatially non-uniform change in magnitude with respect to the direction in which the stress is applied. In most ferrommagnetic materials, stress parallel to the lines of magnetic force increases permeability while stress normal to the flux decreases permeability. Thus, by using ferromagnetic materials characterized by a much greater magnitude of permeability change due to stress in one direction than due to stress in a direction perpendicular thereto, higher output signal levels may be obtained than would otherwise be possible.

A significant advantage obtained by embodiments in accordance with the principles of the invention resides in the fact that such pressure transducer embodiments have a generally linear pressure versus output signal level characteristic over a large range of stress.

The novel features believed to be characteristic of this invention are set forth with particularly in the appended claims. The invention itself, however, both as to its organization and method of operation, together with further objects and advantages thereof, may best be understood by reference to the following description taken in connection with the accompanying drawings.

Figure 1:
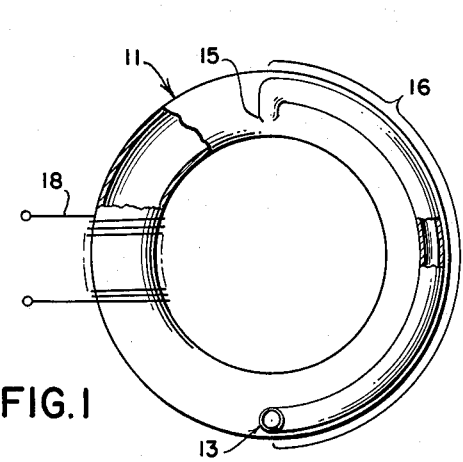
FIG. 1 is a plan view, partially broken away, of a toroidal pressure transducer in accordance with the principles of the invention.

In FIG. 1, there is represented, by way of example, for purposes of illustration, a pressure sensing hollow, thin walled ferromagnetic toroid 11 used as the pressure measuring sensor of the differential pressure transducer, in accordance with the principles of the invention. This perspective, partially cutaway view of the toroid represented in FIG. 1 is ferromagnetic material such as nickel-iron alloy. By way of example, the outside diameter of toroid 11 may be an inch and a half, while the outside diameter of the circular transverse cross-section through one portion of the toroid may be a quarter of an inch. Other appropriate materials for the toroid are nickel-iron-molybdenum, nickel-iron-copper, and nickel-iron-vanadium alloys. The internal volume of toroid 11 is filled with a fluid medium which is the subject of pressure measurement. For the purposes of this example, let us assume that air pressure is to be measured.

The fluid input to the toroid is by way of a capillary input tube 13 connection to the toroid whereby fluid passing through capillary tube 13 may communicate with the internal volume of the toroid. Capillary tube 13 is soldered, welded or otherwise joined to the toroid wall at joint 15 and is then bent external to the toroid into a 180° arc 16. The pressure to be measured is applied to capillary tube 13 and constitutes an input to the internal toroid volume. By virtue of arc 16 in input capillary tube 13, the tube has a certain amount of flexibility, and movement of the tube in several directions may be accommodated without subjecting toroid 11 itself to significant stresses. Stressing of toroid 11 by any agency other than the pressure of the fluid within the toroid is to be avoided, since it would constitute a spurious contribution to the pressure reading.

To properly understand the basis of operation of the embodiment in accordance with the principles of the invention, let us consider a coil 18 upon toroid 11 which is mounted, either as a transformer secondary or as an inductive coil across which an A.-C. electromotive force may be applied. The impedance of the coil is a function of the magnetic permeability, $\mu$, of the ferromagnetic material of toroid 11 about which coil 18 is wound. Since the permeability of the ferromagnetic material of the toroid is a function of stress upon the toroid, the impedance of the coil is in turn a function of the pressure within the toroid. However, it is important to note that stress in the ferromagnetic material has different effects upon the permeability of the material dependent upon whether the stress is applied in a direction parallel to the magnetic flux supported by the material or perpendicular thereto. With the application of pressure to the inside of the toroid, two basic stresses are generated. The first follows the circular path of the toroid in the ferromagnetic material which is a path parallel to the magnetic flux supported by the toroid. The second stress is one which is oriented circumferentially about the transverse cross-section of the toroid at any point. Such stress, sometimes called a hoop stress, is perpendicular to the magnetic flux and operates to change the permeability of the toroid in an opposite sense from that of the parallel stress. Thus, the stress parallel to the magnetic flux tends to increase the permeability of most ferromagnetic materials, while the hoop stress tends to decrease the permeability. It is essential therefore, in order for any pressure introduced into the toroid to provide a net overall change in the permeability of the toroid and therefore in the impedance of the coil, that the stress parallel to the lines of force produce a change in the permeability of magnitude substantially different from that caused by the stress perpendicular to the magnetic flux (otherwise there would be no net permeability change). The hoop stress, in a hollow toroid where the wall thickness is small compared to the diameter of the circular transverse cross-section, is approximately twice the stress parallel to the magnetic flux path in FIG. 1. However, the proper selection of ferromagnetic materials for the toroid is also of considerable importance. In some materials, such as a particular nickel-iron-molybdenum alloy, the decrease in permeability due to perpendicular stress is at least twice as great as the increase in permeability due to parallel stress, and accordingly, introducing pressure into the toroid results in an appropriate net decrease in permeability. It is important, therefore, that the ferromagnetic material be as anisotropic as possible with respect to magnitude of permeability change versus pressure characteristic.

Figure 2:
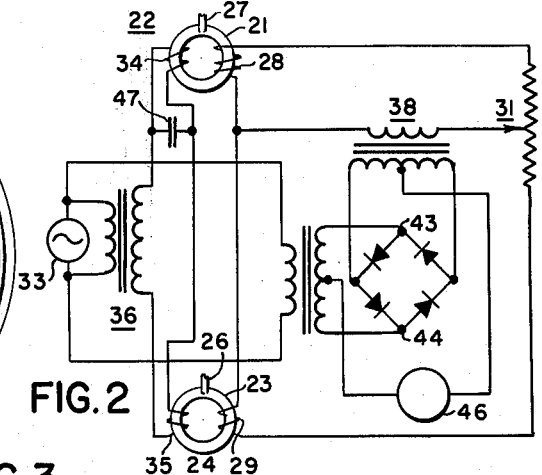
FIGS. 2 and 3 are two differential pressure transducer embodiments, each of which is an application, and employs two, of the transducers of FIG. 1.

In FIG. 2, there is represented an embodiment of a differential pressure transducer in accordance with the principles of the invention, wherein the measuring toroid 21 functions as the core for a first transformer 22, while the reference toroid 23 functions as a ferromagnetic core for a second transformer 24 which is in all respects identical to transformer 22. The reference and measuring toroids are as identical in shape, dimension and material as is possible, although the fluid input 26 to the reference toroid 23 may be left open to the atmosphere, while the fluid input 27 to measuring toroid 21 is connected to the fluid source whose pressure measurement is required.

The primary and secondary windings of the two transformers have the same turns ratio and are mounted in each instance such that the primary is concentric about the secondary (although not so shown in FIG. 2). This superposition of the primary on the secondary winding results in minimization in leakage flux between the primary and the secondary. The secondary windings 28 and 29 are connected in series with a potentiometer voltage divider 31 to provide a midpoint to correspond to the potential of the common connection between secondary windings 28 and 29. Potentiometer 31 provides a zero adjustment, so that a null condition as between the outputs of the two secondaries can be established even though the reference and measuring toroids are not structurally precisely identical. An A.-C. source 33 is applied through transformer 36 to provide a constant voltage to the primary windings 34 and 25. The outputs of secondary windings 28 and 29 are applied through transformer 38 to a demodulator circuit 40 having four diodes poled as indicated, in manner well known in the art. Alternating current source 33, through a suitable transformer, is also connected across a demodulator at points 43 and 44. The output of the demodulator is applied to a D.-C. microammeter 46.

The demodulator circuit eliminates out-of-phase components and harmonics. A capacitor 47 connected across the primary windings 34 or 35 functions to correct for any phase difference.

To avoid spurious readings on meter 46, it is necessary to hold constant the excitation voltage from the A.-C. source 33 because, as will now be demonstrated, the microammeter reading is proportional to the excitation voltage. It can be shown that:

$$E_2/E_1=(\mu-\Delta\mu)/\mu=1-f(p)/\mu \qquad (1)$$

where $E_1$ is the secondary voltage of reference transformer 24, $E_2$ the secondary voltage of measuring transformer 22, $\mu$ is the permeability of both cores at atmospheric pressure and therefore with no stress applied, and $\Delta\mu$ equals the change in permeability as a result of applied pressure. The term $f(p)$ is a function of pressure and is equal to $\Delta\mu$. By rearranging terms in Equation 1, the following expression is obtained:

$$E_1-E_2=E_1f(p)/\mu \qquad (2)$$

Thus, it may be seen that if the voltage output $E_1$ of reference transformer 24 varies, then the output of the pressure transducer will change even though the actual pressure difference between the two toroids and the permeability of the cores remains constant. To avoid a spurious output, therefore, it is necessary to maintain the input excitation voltage constant as by use of a variable transformer or a pair of series related, oppositely poled zener diodes in parallel with the A.-C. source.

Figure 3:
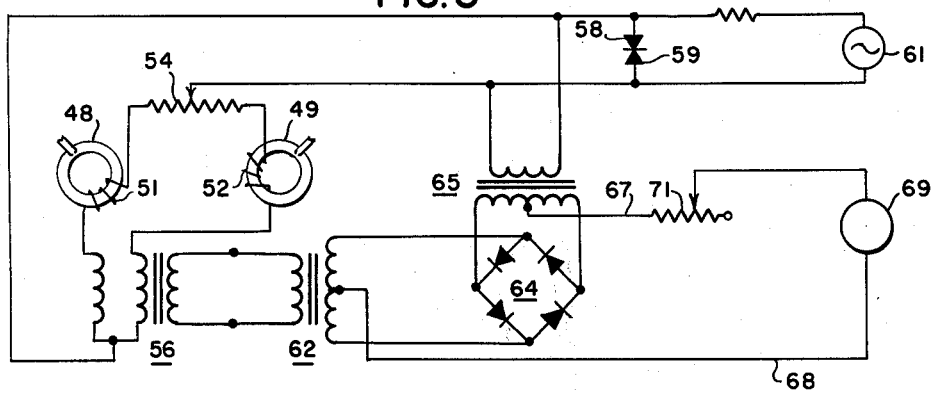

In FIG. 3, there is presented the preferred embodiment in accordance with the principles of the invention, of a differential pressure transducer. In this circuit, the secondary windings have been eliminated and the excitation voltage is applied across inductive coils 51 and 52, the zero adjustment potentiometer 54 and the primary of center tapped transformer 56. The oppositely poled and series related zener diodes 58 and 59 are connected across the A.-C. voltage source 61. The outputs of the measuring and reference toroid coils 51 and 52, respectively, are applied through transformers 56 and 62 to demodulation circuit 64 while the excitation voltage component is applied to demodulator 64 through transformer 65. The output of the demodulator is applied through leads 67 and 68 to the D.-C. microammeter 69. A rheostat 71 is in series with the microammeter to function as a full scale adjustment for the microammeter.

In the operation of FIG. 3, zero adjustment potentiometer 54 is set to provide a zero output reading in ammeter 69 for the situation where no pressure above atmospheric is introduced in the measuring toroid 48. The introduction of any pressure into toroid 48 through its input capillary tube, therefore, results in an output from the center tapped transformer 56, functioning as a differential device, to which the measuring and reference toroid windings 51–52 are coupled. Thus, an imbalance between the output of the coils provides an input to demodulator 64 through transformer 62, and accordingly, an imbalance from the null condition is indicated on ammeter 69.

Figure 4:
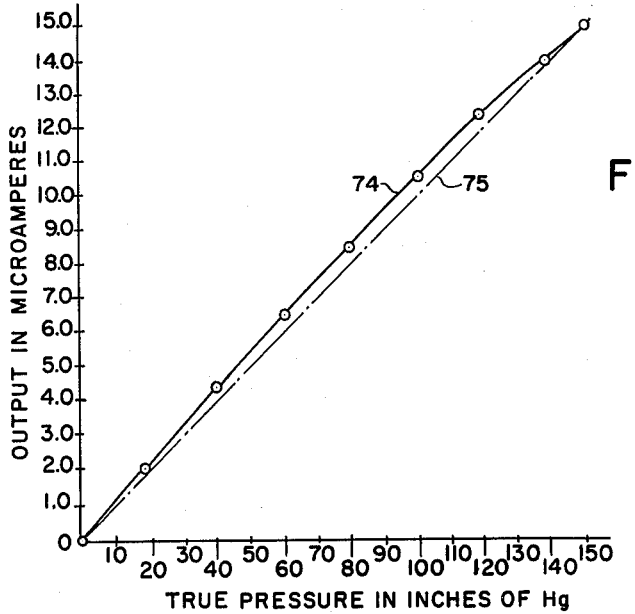
FIG. 4 is a graphic prepresentation of a performance characteristic of the embodiment of FIG. 3.

The preferred embodiment of FIG. 3 results in a pressure differential versus output electrical signal characteristic which is substantially linear. Thus, for example, in an embodiment such as that of FIG. 3 wherein a 4.2 volt, 400 cycle excitation signal is applied, and a 100 ohm zero adjustment resistor utilized, the following response characteristic graphically shown in FIG. 4 was obtained with windings of 1,500 turns on each of toroids 48 and 49 with the full scale adjustment rheostat providing a maximum scale on microammeter 69 of 15 microamperes. Curve 74 of FIG. 4 shows that a substantially linear curve was obtained from zero to 15 microamperes corresponding to a pressure difference over the range from zero to 150 inches of mercury above atmospheric. Curve 74 shows the actual characteristic obtained, while broken line 75 shows a perfectly linear curve for purposes of comparison. It may be noted that the maximum deviation of the response characteristic 74 from linear is about 4% at a reading of 8½ microamperes.

In the operation of any of the embodiments in accordance with the invention, it may be noted from Equation 2 that variation in the ambient temperature may also result in spurious signals, since changes in ambient temperature may change the permeability of the ferromagnetic material. Various means may be used to compensate for such a temperature variation. A change in the output zero may be compensated with a temperature sensitive resistor in series with one of the toroid output windings. A change in the slope of the output signal may be compensated by means of a temperature sensitive resistor in series with the D.-C. output of the electrical circuit.

It is to be understood that there are many differential type circuits which may be used with the closed magnetic circuit pressure transducers in accordance with the principles of the invention to provide differential pressure measuring circuits; the two representative embodiments presented above are merely illustrative. Similarly, various closed magnetic circuit geometries for ferromagnetic materials may be utilized, although the toroid represents the preferred form with presently understood theory.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to be secured by Letters Patent of the United States is:

1. A pressure-to-electrical signal transducer comprising: a continuously hollow endless ferromagnetic core device; means for introducing a fluid into said continuously hollow endless ferromagnetic core device; an electric circuit inductively coupled to said continuously hollow endless ferromagnetic core device; said continuously hollow endless ferromagnetic core device having a geometry providing a closed magnetic circuit for the magnetic flux induced in said device by said electric circuit.

2. A pressure-to-electrical signal transducer comprising: a hollow toroid of ferromagnetic material; means for introducing a fluid, whose pressure is to be determined, into said hollow toroid; and an electric circuit having a means inductively coupled to said ferromagnetic toroid for generating magnetic flux therein and further including means for rendering an electrical signal indicative of variations in said flux due to stress in the toroid.

3. A pressure-to-electrical signal transducer as recited in claim 2 wherein said electric circuit comprises primary and secondary transformer coils wound concentrically with respect to each other upon said toroid.

4. A differential pressure measuring system, comprising: first and second pressure-to-electrical signal transducers each as recited in claim 3; and wherein said electric circuit includes circuit means coupling the secondary coils from said first and second transducers for providing a differential electric signal output from said secondary coils.

5. A pressure-to-electrical signal transducer as recited in claim 2 wherein said coupling of said electric circuit to said toroid is through solely a single coil wound upon said toroid.

6. A differential pressure measuring system, comprising: first and second pressure-to-electrical signal transducers each as recited in claim 5; and wherein said electric circuit includes circuit means coupling the single coils from said first and second transducers for providing a differential electric signal output from said coils.

7. A pressure-to-electrical signal transducer as recited in claim 2 wherein said fluid introducing means is a tube having an arcuate section, with one end of said tube opening into said toroid and the other end connected to a fluid source, whereby stresses generated in said tube are isolated from said toroid.

8. A pressure-to-electrical signal transducer as recited in claim 7 wherein said arc is substantially 180°.

9. A pressure-to-electrical signal transducer as recited in claim 2 wherein said ferromagnetic material is highly anisotropic with respect to change in magnitude of magnetic permeability due to stress in said material.

10. A pressure-to-electrical signal transducer as recited in claim 9 wherein said anisotropy is with respect to stress in the directions parallel and normal to the magnetic flux induced in said toroid by said inductively coupled electric circuit.

11. A pressure-to-electrical signal transducer comprising: a continuously hollow element of material having a magnetic characteristic that varies with stress impressed upon said material; means for applying pressure to said continuously hollow element; means for generating magnetic flux in said element and further including means for providing an electric signal indicative of variations in said flux due to stress; said element having a geometry forming a closed magnetic path for said magnetic flux.

12. A pressure-to-electrical signal transducer as recited in claim 11 wherein the magnitude of said magnetic characteristic variation is highly anisotropic as to the parallel and normal directions relative to said magnetic flux in said element.

13. A pressure-to-electrical signal transducer as recited in claim 11 wherein said means for applying a pressure includes means for introducing a fluid into the hollow part of said element.

14. A pressure-to-electrical signal transducer as recited in claim 13 wherein said element is a toroid with a circular transverse cross-section and the means for generating includes an electric circuit for effecting an output signal indicative of variation in said magnetic characteristic.

References Cited by the Examiner
UNITED STATES PATENTS

| | | | |
|---|---|---|---|
| 2,376,156 | 5/1945 | Kuehni | 73—398 X |
| 2,460,076 | 1/1949 | Emerson | 73—398 |
| 2,887,882 | 5/1959 | Richter | 73—398 |

LOUIS R. PRINCE, *Primary Examiner.*

RICHARD C. QUEISSER, *Examiner.*